(12) United States Patent
Liu et al.

(10) Patent No.: US 10,335,859 B2
(45) Date of Patent: Jul. 2, 2019

(54) WHEEL LIGHTWEIGHT MACHINING FIXTURE AND METHOD

(71) Applicant: CITIC Dicastal CO.,LTD., Qinhuangdao, Hebei (CN)

(72) Inventors: Huiying Liu, Qinhuangdao (CN); Changhai Li, Qinhuangdao (CN); Weimin Cai, Qinhuangdao (CN); Yajun Wang, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 15/797,345

(22) Filed: Oct. 30, 2017

(65) Prior Publication Data
US 2019/0061007 A1  Feb. 28, 2019

(30) Foreign Application Priority Data
Aug. 27, 2017  (CN) .......................... 2017 1 0746876

(51) Int. Cl.
*B23B 5/28* (2006.01)
*B60B 30/06* (2006.01)
(Continued)

(52) U.S. Cl.
CPC ................ *B23B 3/10* (2013.01); *B60B 30/06* (2013.01); *G01B 17/02* (2013.01); *B23B 5/28* (2013.01);
(Continued)

(58) Field of Classification Search
CPC ......... Y10T 82/17; Y10T 82/18; Y10T 82/21; Y10T 82/2514; Y10T 82/26; B23B 5/16;
(Continued)

(56) References Cited

U.S. PATENT DOCUMENTS

| | | | |
|---|---|---|---|
| 493,738 A | * | 3/1893 | Streit ........................ B23B 5/40 82/103 |
| 521,353 A | * | 6/1894 | Wood ........................ B23B 5/40 82/103 |

(Continued)

FOREIGN PATENT DOCUMENTS

CN       102554199 A  *  7/2012

*Primary Examiner* — Sara Addisu
(74) *Attorney, Agent, or Firm* — Cooper Legal Group, LLC

(57) ABSTRACT

Disclosed are a wheel lightweight machining fixture and method. The fixture comprises a rotating chuck, an electric cylinder, a guide rail, a slide block, a first linear motor, radial positioning blocks and the like. When the electric cylinder drives the slide block to move along the guide rail, the position where an first ultrasonic thickness measuring sensor is in contact with a wheel spoke can be adjusted, so that the spoke thicknesses at different positions can be detected. Through motion of the turrets, an second ultrasonic thickness measuring sensor can contact the outer rim of the wheel and detect the rim wall thickness. By integrating a measurement feedback system into the manufacturing process, the disclosure provides a fixture and a method for minimum entity machining of the rim wall thickness and the spoke thickness of a wheel during the first stage turning process, thereby realizing lightweight manufacturing of the wheel.

3 Claims, 2 Drawing Sheets

(51) Int. Cl.
*B23B 3/10* (2006.01)
*G01B 17/02* (2006.01)
*B23B 13/02* (2006.01)

(52) U.S. Cl.
CPC ........... *B23B 13/02* (2013.01); *B23B 2215/08* (2013.01); *B60B 2310/231* (2013.01); *B60B 2900/111* (2013.01); *B60B 2900/112* (2013.01)

(58) Field of Classification Search
CPC .......... B23B 5/28; B23B 13/00; B23B 13/02; B23B 3/10; B23B 2215/08; B60B 30/06; B60B 2900/111; B60B 2900/112; B60B 2310/231; G01B 17/02
See application file for complete search history.

(56) References Cited

U.S. PATENT DOCUMENTS

| | | | | |
|---|---|---|---|---|
| 3,483,795 A * | 12/1969 | Wranosky | | G01B 17/02 33/700 |
| 4,318,293 A * | 3/1982 | Heymanns | | B23B 31/16241 279/123 |
| 4,470,637 A * | 9/1984 | Kopp | | B60B 23/10 301/11.1 |
| 4,699,433 A * | 10/1987 | Kopp | | B60B 1/08 301/105.1 |
| 5,081,889 A * | 1/1992 | Takano | | B23B 5/02 82/122 |
| 5,842,388 A * | 12/1998 | Visser | | B23B 5/02 82/1.11 |
| 6,415,508 B1 * | 7/2002 | Laps | | B23B 5/02 29/894.36 |
| 6,502,834 B1 * | 1/2003 | Fukui | | B23B 31/201 279/156 |
| 7,185,573 B1 * | 3/2007 | Gatton | | B23B 31/001 409/137 |
| 2004/0123707 A1 * | 7/2004 | Kroener | | B23B 5/02 82/1.11 |
| 2006/0042091 A1 * | 3/2006 | Luschei | | B23B 1/00 29/894.35 |
| 2007/0227318 A1 * | 10/2007 | Biertz | | B23Q 3/063 82/150 |
| 2012/0073413 A1 * | 3/2012 | Len | | B23B 5/00 82/104 |
| 2015/0273588 A1 * | 10/2015 | Bowen | | B23B 5/28 82/104 |
| 2017/0312834 A1 * | 11/2017 | Guo | | B23B 31/302 |
| 2018/0001695 A1 * | 1/2018 | Liu | | B23B 7/12 |

* cited by examiner

WHEEL LIGHTWEIGHT MACHINING FIXTURE AND METHOD

CROSS-REFERENCE TO RELATED APPLICATIONS

The present application claims benefit of Chinese Patent Application No. 201710746876.4, filed on Aug. 27, 2017, the contents of which are hereby incorporated by reference in its entirety.

BACKGROUND

On the premise of meeting the safety performance, wheels are gradually developed toward lightweight, and the lightweight of the wheels is not only beneficial to reducing the resistance and oil consumption of automobiles, but also improves the rotating and braking performance of the wheels. For wheel manufacturing enterprises, the weights of wheels are reduced, and aluminum scraps can be recycled to reduce the manufacturing cost, so lightweight manufacturing of wheels is an important technology. In the machining process of wheels, minimum entity manufacturing is an effective way for realizing lightweight production of wheels, i.e., the sizes of wheels are controlled according to minimum entities. The rim wall thicknesses and spoke thicknesses of wheels are key parts influencing the weights of the wheels, so in order to realize lightweight machining minimum entity control must be performed on the rim thicknesses and the spoke thicknesses.

SUMMARY

The disclosure relates to the technical fields of wheel weight reduction and lightweight manufacturing, specifically to a wheel lightweight machining fixture and a lightweight machining method.

The disclosure is aimed at providing a wheel lightweight machining fixture and a lightweight machining method. A measurement feedback system is integrated into the manufacturing process, so that minimum entity control of the rim wall thickness and the spoke thickness is realized on a wheel having the front side not machined in the first stage turning process, and lightweight machining of the wheel is realized.

In order to fulfill the above purpose, the disclosure adopts the following technical solution: a wheel lightweight machining fixture includes a rotating chuck, an electric cylinder, a guide rail, a slide block, a first linear motor, radial positioning blocks, a first piezoelectric sensor, an first ultrasonic thickness measuring sensor, axial positioning blocks, corner cylinder pressure claws, a first vertical lathe turret, an inner rim turning tool, an outer rim turning tool, a clamping base, a second linear motor, a second piezoelectric sensor, an second ultrasonic thickness measuring sensor, a second vertical lathe turret, a central hole flange turning tool and a spoke back cavity turning tool.

Three radial positioning blocks for radial positioning of first stage turning of a wheel, three axial positioning blocks for axial positioning of first stage turning and three corner cylinder pressure claws for pressing the wheel are uniformly distributed on the rotating chuck. Two grooves are bilaterally distributed in the rotating chuck, the electric cylinder and the guide rail are fixedly mounted in the left groove, the slide block is mounted on the guide rail, the output end of the electric cylinder is connected with the slide block, the first linear motor is fixedly mounted on the slide block, the first ultrasonic thickness measuring sensor is mounted at the output end of the first linear motor, and the first piezoelectric sensor is integrated inside the first ultrasonic thickness measuring sensor. When the electric cylinder drives the slide block to move along the guide rail, the position where the first ultrasonic thickness measuring sensor is in contact with a wheel spoke can be adjusted, so that the spoke thicknesses at different positions can be detected.

The inner rim turning tool and the outer rim turning tool are mounted on the first vertical lathe turret for turning the inner rim and outer rim of the wheel. The central whole flange turning tool for turning the central hole and flange surface of the wheel and the spoke back cavity turning tool for turning the spoke back cavity are mounted on the second vertical lathe turret. The clamping base is mounted on the first vertical lathe turret, the second linear motor is mounted on the clamping base, the second ultrasonic thickness measuring sensor is mounted at the output end of the second linear motor, and the second piezoelectric sensor is integrated inside the second ultrasonic thickness measuring sensor. Through motion of the turrets, the second ultrasonic thickness measuring sensor can contact the outer rim of the wheel and detect the rim wall thickness.

A wheel lightweight machining method includes the following procedures.

According to the requirement of the radial detection position of the spoke thickness, the radial position of the first ultrasonic thickness measuring sensor is adjusted via the electric cylinder.

A wheel having the front side downward and the rim upward is clamped onto the rotating chuck; the wheel spoke is required to face the first ultrasonic thickness measuring sensor during clamping.

The wheel is turned by adopting a machining program of wheel size mid-value compilation, the outer rim turning tool on the first vertical lathe turret turns the outer rim, the inner rim turning tool turns the inner rim, the central hole flange turning tool on the second vertical lathe turret turns the central hole and the flange surface, and the spoke back cavity turning tool turns the spoke back cavity.

After turning is completed, the first vertical lathe turret moves, the position of the second ultrasonic thickness measuring sensor is adjusted to face the outer rim of the wheel, then, the second linear motor is started to drive the second ultrasonic thickness measuring sensor to approach the outer rim of the wheel, when the second ultrasonic thickness measuring sensor contacts the outer rim of the wheel, the second piezoelectric sensor picks up a signal, the second linear motor stops moving, and at the moment, the second ultrasonic thickness measuring sensor begins working and detects the rim wall thickness; when the rim wall thickness is detected, the first linear motor is started to drive the first ultrasonic thickness measuring sensor to approach the wheel spoke; when the first ultrasonic thickness measuring sensor contacts the wheel spoke, the first piezoelectric sensor picks up a signal, the second linear motor stops moving, and at the moment, the first ultrasonic thickness measuring sensor begins working and detects the spoke thickness.

A computer compares the detected rim wall thickness and spoke thickness with minimum entity values, and feeds the differences back to a lathe as cutting depths of next precision turning.

After the lathe receives cutting depth instructions, the inner rim turning tool is started to precisely turn the inner rim of the wheel, and the spoke back cavity turning tool is started to precisely turn the spoke back cavity; after precision turning is completed, first stage machining of the wheel is completed, and the rim wall thickness and the spoke thickness undergo minimum entity control.

Finally, the wheel is transferred to a second stage lathe, and after the cap section and the remaining outer rim are turned, turning of the whole wheel is completed.

By integrating a measurement feedback system into the manufacturing process, the disclosure provides a fixture and a method for minimum entity machining of the rim wall thickness and the spoke thickness of a wheel during the first stage turning process, thereby realizing lightweight manufacturing of the wheel. By adopting the fixture and the method, closed-loop control on the rim thickness and the spoke thickness can be realized when each wheel is machined, so that the control precision is high, and the requirement for continuous production is met.

Figure 1:
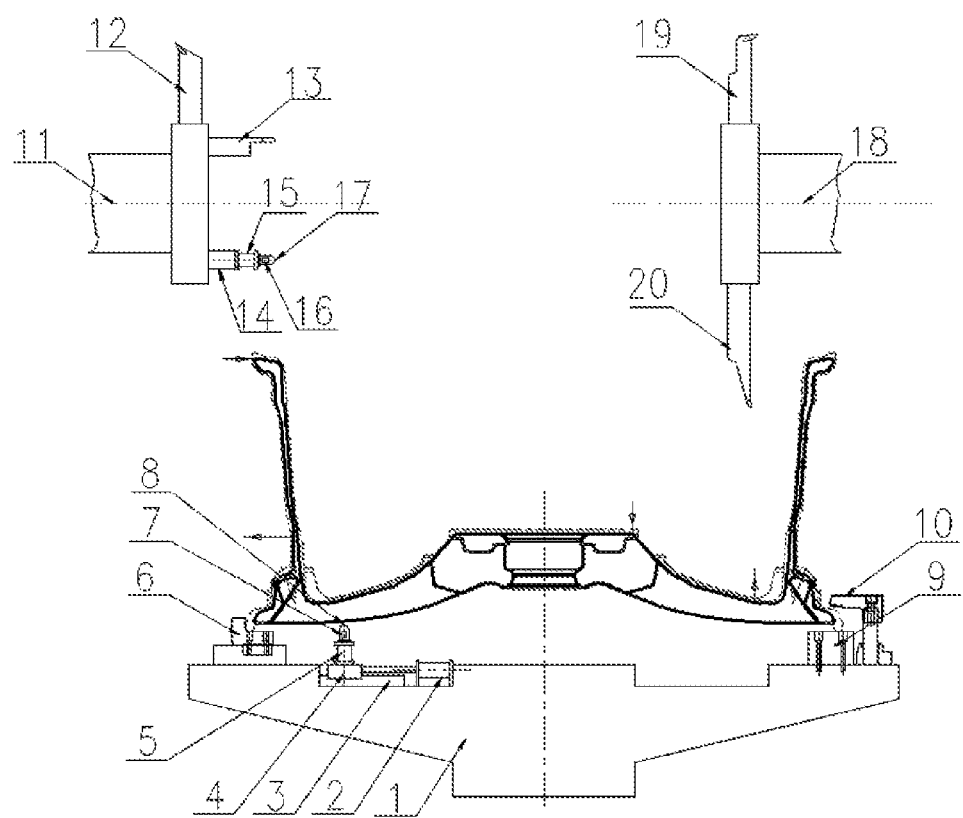
FIG. 1 is a front view of a wheel lightweight machining fixture of the disclosure.
Figure 2:
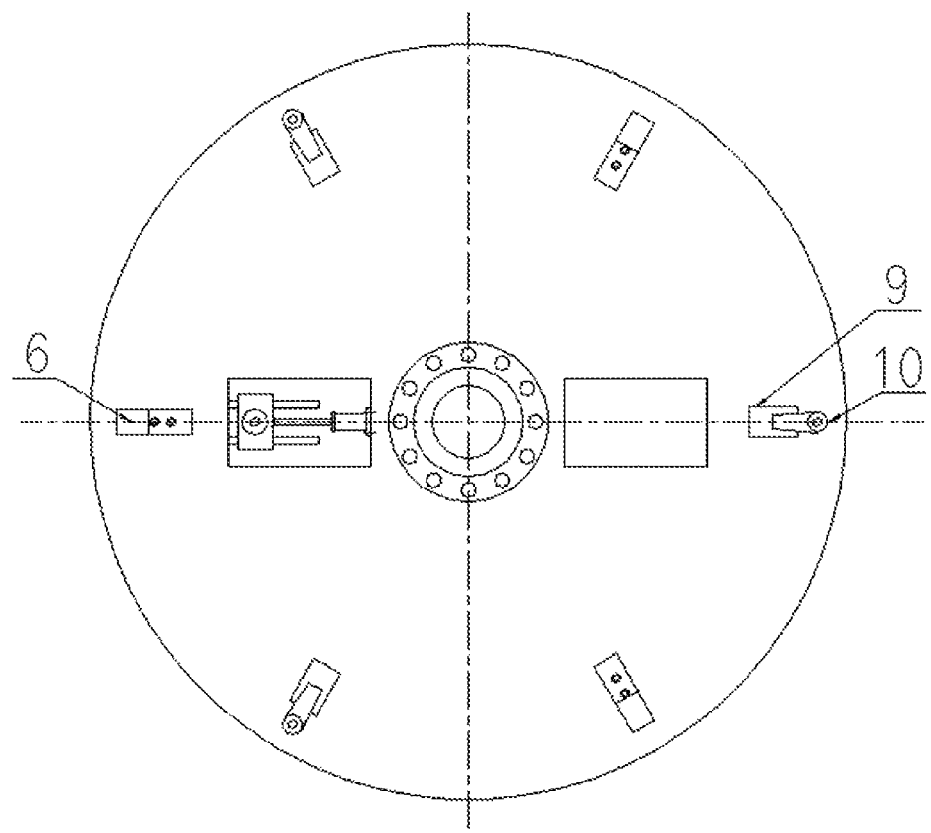
FIG. 2 is a top view of the wheel lightweight machining fixture of the disclosure.

LIST OF REFERENCE SYMBOLS 1 rotating chuck,
2 electric cylinders
3 guide rail
4 slide block
5 first linear motors
6 radial positioning block
7 first piezoelectric sensor
8 first ultrasonic thickness measuring sensor
9 axial positioning block
10 corner cylinder pressure claw
11 first vertical lathe turret
12 inner rim turning tool
13 outer rim turning tool
14 clamping base
15 second linear motor
16 second piezoelectric sensor
17 second ultrasonic thickness measuring sensor
18 second vertical lathe turret
19 central hole flange turning tool
20 spoke back cavity turning tool.

DETAILED DESCRIPTION

Details and works of a specific device provided by the disclosure will be given below in combination with the accompanying drawing and embodiments.

first linear motor, radial positioning blocks, a first piezoelectric sensor, an first ultrasonic thickness measuring sensor, axial positioning blocks, corner cylinder pressure claws, a first vertical lathe turret, an inner rim turning tool, an outer rim turning tool, a clamping base, a second linear motor, a second piezoelectric sensor, an second ultrasonic thickness measuring sensor, a second vertical lathe turret, a central hole flange turning tool and a spoke back cavity turning tool.

Three radial positioning blocks for radial positioning of first stage turning of a wheel, three axial positioning blocks for axial positioning of first stage turning and three corner cylinder pressure claws for pressing the wheel are uniformly distributed on the rotating chuck. Two grooves are bilaterally distributed in the rotating chuck, the electric cylinder and the guide rail are fixedly mounted in the left groove, the slide block is mounted on the guide rail, the output end of the electric cylinder is connected with the slide block, the first linear motor is fixedly mounted on the slide block, the first ultrasonic thickness measuring sensor is mounted at the output end of the first linear motor, and the first piezoelectric sensor is integrated inside the first ultrasonic thickness measuring sensor. When the electric cylinder drives the slide block to move along the guide rail, the position where the first ultrasonic thickness measuring sensor is in contact with a wheel spoke can be adjusted, so that the spoke thicknesses at different positions can be detected.

The inner rim turning tool and the outer rim turning tool are mounted on the first vertical lathe turret for turning the inner rim and outer rim of the wheel. The central hole flange turning tool for turning the central hole and flange surface of the wheel and the spoke back cavity turning tool for turning the spoke back cavity are mounted on the second vertical lathe turret. The clamping base is mounted on the first vertical lathe turret, the second linear motor is mounted on the clamping base, the second ultrasonic thickness measuring sensor is mounted at the output end of the second linear motor, and the second piezoelectric sensor is integrated inside the second ultrasonic thickness measuring sensor. Through motion of the turrets, the second ultrasonic thickness measuring sensor can contact the outer rim of the wheel and detect the rim wall thickness.

A wheel lightweight machining method includes the following procedures.

(1) According to the requirement of the radial detection position of the spoke thickness, the radial position of the first ultrasonic thickness measuring sensor is adjusted via the electric cylinder.

(2) A wheel having the front side downward and the rim upward is clamped onto the rotating chuck, the wheel spoke is required to face the first ultrasonic thickness measuring sensor during clamping.

(3) The wheel is turned by adopting a machining program of wheel size mid-value compilation, the outer rim turning tool on the first vertical lathe turret turns the outer rim, the inner rim turning tool turns the inner rim, the central hole flange turning tool on the second vertical lathe turret turns the central hole and the flange surface, and the spoke back cavity turning tool turns the spoke back cavity.

(4) After turning is completed, the first vertical lathe turret moves, the position of the second ultrasonic thickness measuring sensor is adjusted to face the outer rim of the wheel, then, the second linear motor is started to drive the second ultrasonic thickness measuring sensor to approach the outer rim of the wheel, when the second ultrasonic thickness measuring sensor contacts the outer rim of the wheel, the second piezoelectric sensor picks up a signal, the second linear motor stops moving, and at the moment, the second ultrasonic thickness measuring sensor begins working and detects the rim wall thickness; when the rim wall thickness is detected, the first linear motor is started to drive the first ultrasonic thickness measuring sensor to approach the wheel spoke; when the first ultrasonic thickness measuring sensor contacts the wheel spoke, the first piezoelectric sensor picks up a signal, the second linear motor stops moving, and at the moment, the first ultrasonic thickness measuring sensor begins working and detects the spoke thickness.

(5) A computer compares the detected rim wall thickness and spoke thickness with minimum entity values, and feeds the differences back to a lathe as cutting depths of next precision turning.

(6) After the lathe receives cutting depth instructions, the inner rim turning tool is started to precisely turn the inner rim of the wheel, and the spoke back cavity turning tool is started to precisely turn the spoke back cavity; after precision turning is completed, first stage machining of the wheel is completed, and the rim wall thickness and the spoke thickness undergo minimum entity control.

(7) Finally, the wheel is transferred to a second stage lathe, and after the cap section and the remaining outer rim are turned, turning of the whole wheel is completed.

Embodiment 1

Known is a 17-inch wheel to be machined, the wall thickness of the middle rim is 4±0.25 mm, the spoke is at R120 mm, and the spoke thickness is 30±0.8 mm. The lightweight machining method is as follows.

(1) According to the requirement of the radial detection position (R120 mm) of the spoke thickness, the radial position of the first ultrasonic thickness measuring sensor 8 is adjusted to R120 mm via the electric cylinder 2.

(2) The wheel having the front side downward and the rim upward is clamped onto the rotating chuck 1, in which the wheel spoke is required to face the first ultrasonic thickness measuring sensor 8 during clamping.

(3) The wheel is turned by adopting a machining program of wheel size mid-value compilation, the outer rim turning tool 13 on the first vertical lathe turret 11 turns the outer rim, the inner rim turning tool 12 turns the inner rim, the central hole flange turning tool 19 on the second vertical lathe turret 18 turns the central hole and the flange surface, and the spoke back cavity turning tool 20 turns the spoke back cavity.

(4) After turning is completed, the first vertical lathe turret 11 moves, the position of the second ultrasonic thickness measuring sensor 17 is adjusted to face the outer rim of the wheel, then, the second linear motor 15 is started to drive the second ultrasonic thickness measuring sensor 17 to approach the outer rim of the wheel, when the second ultrasonic thickness measuring sensor 17 contacts the outer rim of the wheel, the second piezoelectric sensor 16 picks up a signal, the second linear motor 15 stops moving, and at the moment, the second ultrasonic thickness measuring sensor 17 begins working and detects the rim wall thickness; when the rim wall thickness is detected, the first linear motor 5 is started to drive the first ultrasonic thickness measuring sensor 8 to approach the wheel spoke; when the first ultrasonic thickness measuring sensor 8 contacts the wheel spoke, the first piezoelectric sensor 7 picks up a signal, the second linear motor 15 stops moving, and at the moment, the first ultrasonic thickness measuring sensor 8 begins working and detects the spoke thickness.

(5) A computer compares the detected rim wall thickness and spoke thickness with minimum entity values, in which the detected rim wall thickness is 3.95 mm, and a difference is drawn from the minimum entity size 3.75 mm; the difference 0.2 mm is fed back to a lathe as a cutting depth of next precision turning of the inner rim; the detected spoke thickness is 30.1 mm, and a difference is drawn from the minimum entity size 29.2 mm; the difference 0.9 mm is fed back to the lathe as a cutting depth of next precision turning of the spoke back cavity.

(6) After the lathe receives cutting depth 0.2 mm and 0.9 mm instructions, the inner rim turning tool 12 is started to precisely turn the inner rim of the wheel, and the spoke back cavity turning tool 20 is started to precisely turn the spoke back cavity; after precision turning is completed, first stage machining of the wheel is completed, and the rim wall thickness and the spoke thickness undergo minimum entity control.

(7) Finally, the wheel is transferred to a second stage lathe, and after the cap section and the remaining outer rim are turned, turning of the whole wheel is completed.

The invention claimed is:

1. A wheel lightweight machining fixture, comprising a rotating chuck, an electric cylinder, a guide rail, a slide block, a first linear motor, a first piezoelectric sensor, a first ultrasonic thickness measuring sensor, a first vertical lathe turret, a second linear motor, a clamping base for clamping the second linear motor, a second piezoelectric sensor, a second ultrasonic thickness measuring sensor, and a central hole flange turning tool for turning a central hole and a flange surface of a wheel, wherein two grooves are bilaterally distributed in the rotating chuck, the electric cylinder and the guide rail being fixedly mounted in a left groove of the two grooves, the slide block is mounted on the guide rail, an output end of the electric cylinder is connected with the slide block, the first linear motor is fixedly mounted on the slide block, the first ultrasonic thickness measuring sensor is mounted at an output end of the first linear motor, and the first piezoelectric sensor is located inside the first ultrasonic thickness measuring sensor; when the electric cylinder drives the slide block to move along the guide rail, the first ultrasonic thickness measuring sensor can be in contact with different positions on a spoke of the wheel, so that a spoke thicknesses at different positions can be detected.

2. The wheel lightweight machining fixture of claim 1, wherein the clamping base is mounted on the first vertical lathe turret, the second linear motor is mounted on the clamping base, the second ultrasonic thickness measuring sensor is mounted at an output end of the second linear motor, and the second piezoelectric sensor is located inside the second ultrasonic thickness measuring sensor; through vertical movement and horizontal movement of the first vertical lathe turret, the second ultrasonic thickness measuring sensor can contact an outer rim of the wheel and detect a rim wall thickness.

3. The wheel lightweight machining fixture of claim 1, wherein the wheel having a front side downward and a rim upward is clamped onto the rotating chuck, and the spoke of the wheel is required to face the first ultrasonic thickness measuring sensor during clamping.

* * * * *